United States Patent Office 3,455,838

Patented July 15, 1969

3,455,838

METHOD OF ENCAPSULATING WATER-INSOLUBLE SUBSTANCES AND PRODUCT THEREOF

Nicholas G. Marotta, Milltown, Richard M. Boettger, Morristown, Bernard H. Nappen, Cranford, and Chester D. Szymanski, Martinsville, N.J., assignors to National Starch and Chemical Corporation, New York, N.Y., a corporation of Delaware No Drawing. Filed Apr. 22, 1966, Ser. No. 544,414

Int. Cl. B01j 13/02; A23l 3/00; A61k 3/07

U.S. Cl. 252—316 6 Claims

ABSTRACT OF THE DISCLOSURE

A method for encapsulating water-insoluble substances which comprises the spray drying of an aqueous dispersion of a dextrinized starch acid-ester of a substituted dicarboxylic acid in which said water-insoluble substance has been emulsified. The resulting encapsulated particles are useful in a variety of applications, such, for example, as in the preparation of foods, pharmaceuticals and cosmetics.

This invention relates to a method for the encapsulation of both volatile and nonvolatile materials and to the encapsulated products thus obtained, and relates more particularly to the preparation and use of improved encapsulating dextrins and to the resulting encapsulated products.

It is the object of the present invention to provide dextrins for use in the encapsulation of volatile materials such as flavorings, oils, and perfumes as well as nonvolatile materials such as high melting fats. A further object involves the preparation of encapsulating dextrins which are superior in their encapsulating ability to the dextrins and other materials heretofore employed for this purpose and which are, furthermore, free from the characteristic color, aroma, and taste ordinarily associated with such encapsulating dextrins. Various other objects and advantages of this invention will become apparent from the following detailed description thereof.

The use of volatile flavoring oils and perfumes in such applications as foods and cosmetics is often greatly hampered by the rapid evaporation and consequent loss of the volatile component. Thus, although the practitioner may prepare a food, cosmetic or other product which initially contains the appropriate degree of flavor or fragrance, the ultimate consumer often finds that there has been a considerable reduction in these properties. This loss will, of course, detract from the desirability as well as from the utility of the products concerned. In addition to foods and cosmetics, this problem is similarly encountered in other situations wherein it is necessary to entrap volatile substances as, for example, in connection with pharmaceuticals, detergents and the like.

Various techniques have been proposed in an effort to overcome this problem. These procedures generally involve the preparation of solid compositions containing the volatile ingredient entrapped therein. Such compositions may be prepared, for example, by mixing the volatile oil with a suitable absorbent base. In another method, the volatile materials are dispersed with solutions of various protective colloids, in which form they are then dried and ground.

Of late, the technique of spray drying has found wide acceptance as a means for preparing solid particles containing entrapped flavors, perfumes or other water-insoluble substances. In this technique, an oil to be encapsulated is first emulsified in an aqueous solution or dispersion of a water-dispersible protective colloid such as gelatin, gum arabic, starch or dextrin. This emulsion is then sprayed into a column of heated air or gases thereby evaporating the water from the emulsion. It is believed that the dry particles resulting from the spray drying process comprise a matrix of the dried colloid, in which the oil is embedded or encapsulated in the form of minute droplets. The oil may also possibly be absorbed in the colloid base.

In addition to the spray drying procedure, other means of drying the above described emulsions have also been proposed. Thus, for example, they may be spread on belts and passed through drying tunnels, they may be passed over heated drums, or they may be freeze-dried, etc. In all cases, however, spray drying and these other related drying techniques permit the practitioner to put water-immiscible oils or other substances into a solid, highly water-dispersible form which readily lends itself to blending with a wide variety of other ingredients while also offering protection against evaporation of a volatile component from the dry particles. Among the possible applications for such encapsulated oil particles, one may list their use in foods, cosmetics, spices, pharmaceuticals, soaps, detergents, bleaches and cleansers. Since any active ingredient may be thus entrapped, other suitable uses will be apparent to those skilled in the art.

As has been noted, dextrins are among the water-dispersible protective colloids which may be employed in the preparation of emulsions for use in spray drying. As is known in the art, dextrins are the conversion products formed by the incomplete hydrolysis of starch as a result of the action of dilute acids or by heating of the dry starch. Although dextrins provide efficient encapsulating agents and are considerably lower in cost than such colloids as gelatin and gum arabic, their use in the preparation of spray dried perfumes and oils has, nonetheless, been limited. These limitations on the use of dextrins result from the characteristic aroma, taste, and dark color which are ordinarily associated with dextrins and which are, in turn, imparted to the resulting encapsulated, spray dried products.

Obviously the presence of this color along with the dextrin aroma and taste are highly undesirable in these spray dried products and particularly in the case of spray dried perfumes and flavoring oils. In an effort to alleviate this problem, attempts have been made to employ dextrins which have been subjected to a lesser degree of conversion so as to produce products which were lighter in color and which had a less pronounced taste and aroma. However, these mildly converted dextrins have not been successful as encapsulating agents since their encapsulating ability, as described in terms of the percent of volatile oil which is lost during the spray drying process, is considerably inferior to the more highly converted dextrins.

We have now discovered that the use of a particular type of dextrin as an encapsulating agent provides spray dried products which are free from the characteristic color, aroma, and taste which have heretofore been associated with the use of ordinary dextrins. Moreover, our encapsulating dextrins have, surprisingly, been found to be superior in their encapsulating ability to these conventional dextrins as well as to various other encapsulating colloids such as gum arabic and gelatin. This superior encapsulating ability is believed to result from the finer particle size of the emulsions which are prepared from our encapsulating dextrins; this factor, in turn, resulting in spray dried products which exhibit a volatile oil loss substantially lower than that which is noted in the case of spray dried products made with ordinary dextrins and other encapsulating colloids.

The encapsulating agents of this invention comprise dextrins derived from ungelatinized starch acid-esters of substituted dicarboxylic acids. Such starch acid-esters may be represented diagrammatically by the following formula:

$$\text{starch-O—O—C—}\overset{R_1}{\overset{|}{R}}\text{—COOH}$$

wherein R is a radical selected from the class consisting of $R_1$-substituted dimethylene and $R_1$-substituted trimethylene radicals, and $R_1$ is a hydrocarbon constituent selected from the class consisting of alkyl, alkenyl, aralkyl, or aralkenyl groups. These ungelatinized starch acid-esters are prepared by reacting an ungelatinized starch, in an alkaline medium, with a substituted cyclic dicarboxylic acid anhydride having the following formula:

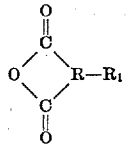

wherein R and $R_1$ represent the same substituent groups referred to above for these symbols. Substituted cyclic dicarboxylic anhydrides falling within this formula are the substituted succinic and glutaric acid anhydrides. Further details for the preparation of these starch derivatives may be found in U.S. Patent 2,661,349, dated Dec. 1, 1953.

These acid-ester dextrins are, preferably, prepared from such starches as waxy maize, waxy sorghum, sago, tapioca and potato. In addition, such starches as corn, sorghum, rice and wheat may also be employed where desired by the practitioner, However, although the acid-ester dextrins derived from the latter group of starch bases are less efficient in their encapulating ability as compared with the acid-ester dextrins derived from the earlier named group, such acid-ester dextrins are, nonetheless, superior in their encapsulating ability to conventional, underivatized dextrins prepared from comparable base starches. Furthermore, these applicable starch bases may be in their raw, unmodified state or they may have been previously modified in any desired manner as, for example, by hydrolysis, oxidation, esterification or etherification. In all instances, however, the applicable starch bases should be in an ungelatinized form, i.e., in the form of their original intact granules, and should remain in that form throughout the subsequent derivatization process.

In covering these starch derivatives into dextrins, one may employ any of the usual dextrinization procedures well known to those skilled in the art, including treatment of starch with either heat or acid or by any other means desired by the practitioner. It should be noted that when reference is made to "dextrins" in the process of this invention, we also contemplate as included therein the degraded starch products prepared either by means of a process wherein the applicable starch derivatives are converted with acids and/or oxidizing agents, in the presence of water, at superatmospheric pressures and temperatures in excess of about 212° F., or, by means of an enzyme conversion procedure utilizing such enzymes as alpha-amylase. Additional information relating to the dextrinization of starches, in addition to the descriptive examples herein, may also be obtained by reference to chapters XII–XIII of "Chemistry and Industry of Starch," by R. W. Kerr, published in 1950 by the Academic Press of New York, N.Y.

All of the acid-ester dextrins which are applicable in the encapsulating process of this invention are fully compatible with all types of volatile oils, perfumes, flavors and other relatively water-insoluble substances, yielding encapsulated products which are devoid of any color, aroma, or taste which is ordinarily associated with conventional dextrins.

In using these acid-ester dextrins as encapsulating agents for the entrapment of volatile oils and other water-insoluble substances, it is first necessary to disperse or dissolve them in water; the resulting solution having a pH level preferably in the range of from about 2 to 8. This is usually accomplished by adding the acid-ester dextrin, under agitation, to water which has previously been heated to a temperature of from about 100° to 210° F. After solution of the dextrin is complete, the water-insoluble substance which is to be entrapped (e.g., oil, perfume or the like) is slowly added and the mixture is rapidly agitated until such time as emulsification is complete.

The resulting emulsion may then be dried by any suitable means, preferably by spray drying, although as noted earlier, drying may also be effected by passage of the emulsion over heated drums, by spreading it on belts which are then passed through a heating tunnel or by freeze-drying. The preferred spray drying technique may be accomplished using any commercially available spray drying equipment capable of providing an inlet temperature in the range of approximately 212° to 520° F. When drying by means other than spray drying, it is ordinarily necessary to grind the resultant dried material to the desired particle size.

Regardless of the drying procedure which is employed, the resulting encapsulated particles are, in all cases, dry, stable, free flowing solids which are easily handled by conventional mixing or packaging apparatus without danger of breakage or other damage. When these particles are brought into contact with water, as by immersion or moistening, they soon dissolve thereby releasing their entrapped oils. Moreover, these encapsulated particles are free from the characteristic color, taste, and aroma ordinarily associated with conventional dextrins.

In those cases where the desired solubility of our dextrins is incomplete or limited, it may be convenient to treat these dextrins, prior to their ultimate dispersion, so as to effectively increase their solubility. This may be accomplished by a variety of techniques. One such procedure involves hydrating the dextrin for about 15–20 minutes by immersing it in water which is at a temperature of about 70–80° F. and then merely spray drying the resulting solution. The spray dried dextrin, which is readily soluble in cold water, may then be employed in the above described emulsification procedure. Another technique involves cooking the dextrin, under agitation, for about 20 minutes in water which is at a temperature of about 150–180° F. These cooked dispersions are then brought back to their original weight by the addition of water, so as to compensate for any water loss effected by evaporation, and thereupon cooled to a temperature of about 75–90° F. These cooked dextrins may then be employed in the above described procedure, having now been fully dispersed and requiring only the addition of the volatile oil and subsequent agitation period so as to complete the emulsification process.

With regard to proportions, there are no critical limits. The aqueous dispersions of these acid-ester dextrins may ordinarily contain from about 20 to 65%, by weight, of these materials. The amount of volatile oil which may then be emulsified in these dispersions is also subject to variation, depending upon the particular dextrin and the oil which is being emulsified. Thus, in some cases, one may encapsulate as much as 1.5 parts, by weight, of the substance to be entrapped per 1 part, by weight, of the encapsulating dextrin present in the dispersion. It should be noted that all types of oils, perfumes and other relatively water-insoluble substances are fully compatible with these encapsulating agents.

The following examples will more fully illustrate the embodiment of our invention. All parts given are by weight, unless otherwise indicated.

EXAMPLE I

This example illustrates the use, as encapsulating agents, of the acid-ester dextrins according to the process of this invention.

The encapsulating agent prepared and utilized in this example comprised a dextrinized waxy maize acid-ester of a substituted succinic acid, derived from octenyl succinic acid anhydride. The acid-ester base was prepared according to the procedure described in Example II of U.S. Patent 2,661,349 with the exception that the starch base employed was a waxy maize starch.

In converting this waxy maize acid-ester to a dextrin, it was acidified with dilute hydrochloric acid until its pH, as measured by suspending one part of the acidified starch in four parts of water, was at a level of about 3. This conversion was carried out on a belt type converter running at a 15 minute heating period wherein the final temperature was 375° F.

The resulting dextrin was off-white in color and was free from the taste and aroma ordinarily associated with dextrins. The viscosity of this dextrin, as expressed in terms of its anhydrous borax fluidity value, hereinafter referred to as the ABF value, was 2.8. (The ABF value is defined as the ratio of the amount of water to the amount of dextrin when the latter is cooked for five minutes at 195° F. with 15% of borax on the weight of dextrin, so as to provide a dispersion having a viscosity, when cooled to 77° F., of 70 centipoises.)

An emulsion was prepared from the resulting dextrin product by dispersing 400 parts of the latter in 800 parts of water; the resulting dispersion then being heated to 160° F. and thereupon being cooled to 80–85° F. At this point, 100 parts of lemon oil were slowly added to the dispersion and emulsification of the resulting mixture was effected by passing it through a colloid mill.

This emulsion was spray dried using a commercial spray drier whose inlet temperature was 356°±5° F. and whose outlet temperature was 212°±5° F. The spray dried particles, which contained 20% of lemon oil as based on the dry weight of the particles, were dry, stable, free flowing solids which were easily handled without any breakage or other damage. In addition, the encapsulated particles were free from the characteristic color, odor, and taste ordinarily associated with conventional dextrin products.

The above described procedure was then repeated under identical conditions with the following exceptions: (1) waxy sorghum, tapioca, sago and potato starches were each, respectively, substituted for the waxy maize starch; (2) decenyl succinic acid anhydride, nonenyl succinic acid anhydride and heptyl glutaric acid anhydride were each, respectively, substituted for the octenyl succinic acid anhydride; and, (3) peppermint oil, vanilla, eugenol and spearmint were each, respectively, substituted for the lemon oil. The characteristics of the encapsulated particles thus produced were found to be comparable to those obtained utilizing the procedure described above.

EXAMPLE II

This example further illustrates the use, as encapsulating agents, of acid-ester dextrins according to the process of this invention.

The procedure utilized to prepare the encapsulated particles of this example was identical to that set forth in Example I, hereinabove, with the exceptions that (1) a tapioca based starch was substituted for the waxy maize starch utilized therein, and (2) the dextrinization of the starch acid-ester was accomplished by means of the following procedure:

An aqueous slurry, having a pH level of 7.0, was prepared so as to contain 30%, by weight, of a tapioca acid-ester of a substituted succinic acid, derived from octenyl succinic acid anhydride, and 0.025%, by weight, of alpha-amylase. The resulting slurry was then heated to a temperature of 95° C. at a rate of 4° C. per minute. This temperature was maintained for a period of 20 minutes in order to inactivate the enzyme whereupon the resulting solution was cooled to room temperature. The solution was then acidified by means of the addition of hydrochloric acid. The ABF value of the resulting dextrinized product was determined as 3.1. The solution resulting from the above process was then directly used in the emulsification procedure described in Example I.

The encapsulated lemon oil particles, resulting from the completed procedure as set forth in Example I, were dry, stable, free flowing solids which were easily handled without any breakage or other damage.

EXAMPLE III

This example illustrates the superior encapsulating ability of the acid-ester dextrins utilized in the process of this invention in comparison with the results obtained utilizing conventional encapsulating agents under identical conditions.

Encapsulated lemon oil particles were prepared by means of the procedure set forth in Example I, hereinabove, wherein each of the following encapsulating agents were, in turn, utilized:

(1) A dextrinized waxy maize acid-ester of a substituted succinic acid, derived from octenyl succinic acid anhydride (as described in Example I).

(2) An enzyme degraded tapioca acid-ester of a substituted succinic acid, derived from octenyl succinic acid anhydride (as described in Example II).

(3) A dextrinized tapioca acid-ester of a substituted succinic acid, derived from octenyl succinic acid anhydride; the acid-ester base being prepared by means of the procedure described in Example I of U.S. Patent 2,661,349.

(4) Gum arabic.

(5) The reaction product of aluminum sulfate and an acid converted low viscosity waxy maize acid-ester of a substituted succinic acid, derived from octenyl succinic acid anhydride; the waxy maize starch base having been previously acid converted to a degree known in the trade as 85 fluidity (prepared by means of the procedure described in Example IX of U.S. Patent 2,613,206).

(6) A dextrinized corn starch.

In order to compare the encapsulating ability of the various encapsulating agents, standard analytical techniques were employed to determine the amount of lemon oil which was lost during the spray drying of each of the respective emulsions. Thus, these emulsifiers were evaluated by comparing the difference between the oil concentration in the resulting spray dried particles as against the oil concentration, i.e., 20%, by weight, which was present in the initial emulsions; the latter figure being hereinafter referred to as the "percent oil loss." The results of these determinations are presented in the following table.

| Encapsulating agent: | Percent oil loss |
|---|---|
| 1 | 5 |
| 2 | 4 |
| 3 | 3–5 |
| 4 | 9.1 |
| 5 | 6 |
| 6 | 15 |

The data summarized above clearly indicates the superior encapsulating ability of the acid-ester dextrins utilized in the process of this invention.

EXAMPLE IV

This example further illustrates the superior encapsulating ability of the acid-ester dextrins utilized in the process of this invention; the dextrins in this instance being utilized to encapsulate high melting fats.

In order to compare the fat encapsulating potential of a number of different encapsulating agents, various fats were emulsified and spray dried by means of the general procedure set forth in Example I. The resulting spray dried particles were then dispersed in water so as to yield emulsions having a solids content of 0.05%, by weight. When the dispersion was completed, the optical densities of the resulting emulsions were measured utilizing a spectrometer which was set at a wave length of 450 microns. It should be noted that at these concentration levels, the encapsulating agents would themselves exhibit little, if any, cloud formation and thereby register little, if any, optical density.

Thus, since the use of the more effective encapsulating agents would aid in forming initial emulsions of a smaller fat droplet size and thereby provide a greater retention of fat in the resulting spray dried particles, their subsequent reconstitution in water would therefore provide a greater cloud opacity and a correspondingly greater optical density as compared with the results obtained with less efficient encapsulating agents.

The various encapsulating agents utilized in this example as well as the optical densities of the emulsified fat particles are presented in the following table. The encapsulated fat particles described in Part A contained 50%, by weight, of a coconut fat having a melting point of 76° F., while the particles described in Part B of the table contained 23%, by weight, of a coconut fat having a melting point of 110° F.

| Encapsulating agent: | Optical density |
|---|---|
| (Part A) | |
| The acid-ester dextrin described in Example I, hereinabove | 1.00 |
| Gum arabic | 0.69 |
| (Part B) | |
| The acid-ester dextrin described in Example I, hereinabove | 0.52 |
| The acid hydrolyzed waxy maize acid-ester listed as encapsulating agent #5 in Example II hereinabove | 0.26 |
| A dextrinized corn starch | 0.17 |
| A dextrinized tapioca starch | 0.05 |
| A dextrinized waxy maize starch | 0.15 |
| A mixture of dextrinized corn and tapioca starches | 0.07 |

The data summarized hereinabove clearly indicates the excellent encapsulating and cloud formation properties of the novel encapsulating agents of this invention.

Summarizing, our invention is thus seen to provide the practitioner with an improved encapsulating dextrin of superior and diversified encapsulating ability.

Variations may, of course, be made in proportions, procedures and materials without departing from the scope of this invention which is defined by the following claims.

We claim:

1. A method for encapsulating water-insoluble substances which comprises making an aqueous dispersion of an encapsulating agent consisting essentially of a dextrinized starch acid-ester of a substituted dicarboxylic acid having the following formula:

$$\text{starch-O—O—C—}\underset{}{\overset{R_1}{\overset{|}{R}}}\text{—COOH}$$

wherein R is a radical selected from the group consisting of $R_1$-substituted dimethylene and $R_1$-substituted trimethylene radicals, and $R_1$ is a hydrocarbon constituent selected from the group consisting of alkyl, alkenyl, aralkyl, and aralkenyl radicals; emulsifying the water-insoluble substance in said dispersion; and, thereupon drying the resulting emulsion, thus forming dry, free flowing particles comprising the encapsulating agent containing the water-insoluble substance encapsulated therein.

2. The method of claim 1, wherein said encapsulating agent is present in said aqueous dispersion in a concentration of from about 20 to 65%, by weight.

3. The method of claim 2, wherein said encapsulating agent is a dextrinized starch acid-ester of a substituted succinic acid, derived from octenyl succinic acid anhydride.

4. The method of claim 1 in which said emulsion is dried by spray drying.

5. Dry, free flowing particles containing a water-insoluble substance encapsulated therein, said particles consisting essentially of a solid matrix of an encapsulating agent consisting essentially of a dextrinized starch acid-ester of a substituted dicarboxylic acid having the following formula:

$$\text{starch-O—O—C—}\underset{}{\overset{R_1}{\overset{|}{R}}}\text{—COOH}$$

wherein R is a radical selected from the group consisting of $R_1$-substituted dimethylene and $R_1$-substituted trimethylene radicals, and $R_1$ is a hydrocarbon constituent selected from the group consisting of alkyl, alkenyl, aralkyl, and aralkenyl radicals; said matrix having said water insoluble substance embedded therein in the form of minute droplets.

6. The particles of claim 5, wherein said encapsulating agent is a dextrinized starch acid-ester of a substituted succinic acid, derived from octenyl succinic acid anhydride.

References Cited

UNITED STATES PATENTS

| | | | |
|---|---|---|---|
| 2,661,349 | 12/1953 | Caldwell et al. | 260—224 |
| 3,016,308 | 1/1962 | Macaulay | 252—316 X |
| 3,091,567 | 5/1963 | Wurzburg et al. | 252—316 X |
| 3,159,585 | 12/1964 | Evans et al. | 252—316 |

RICHARD D. LOVERING, Primary Examiner

U.S. Cl. X.R.

99—118, 123, 140, 166; 252—90, 522; 424—35